UNITED STATES PATENT OFFICE.

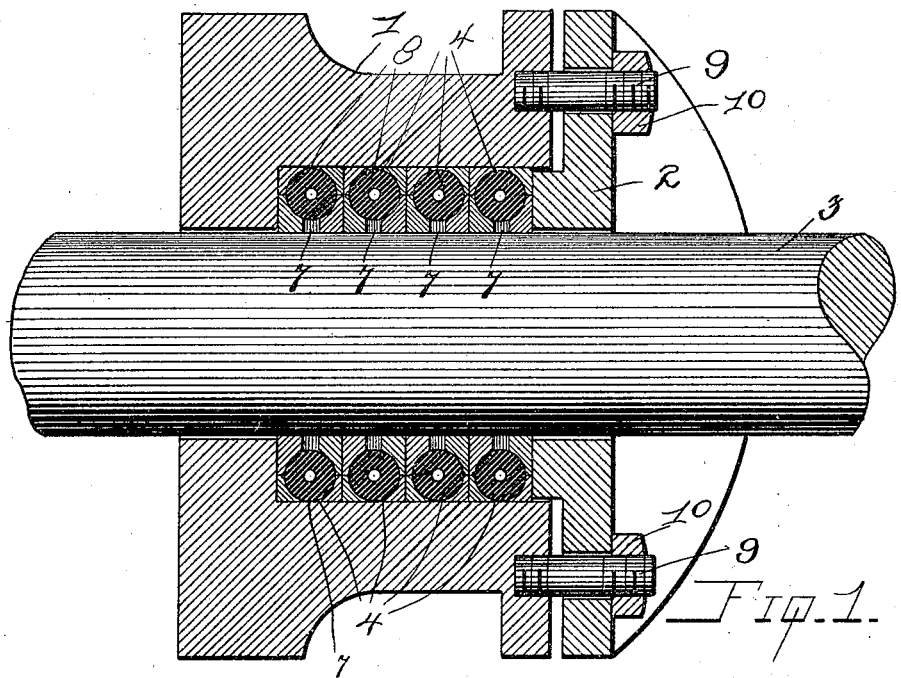
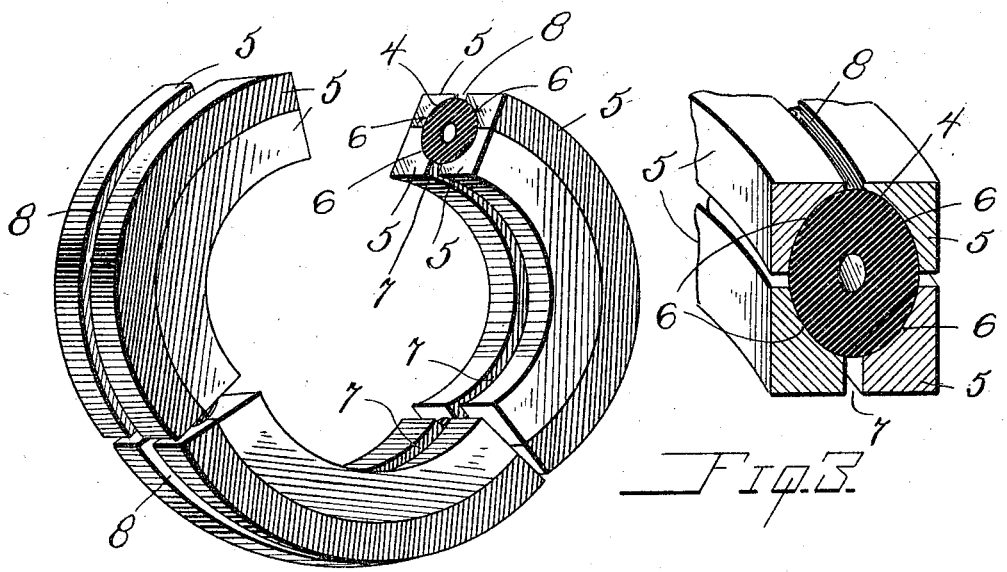

ELMER E. SWITZER, OF HUTTIG, ARKANSAS.

ROD-PACKING.

952,769.  Specification of Letters Patent.  Patented Mar. 22, 1910.

Application filed September 11, 1909. Serial No. 517,272.

*To all whom it may concern:*

Be it known that I, ELMER E. SWITZER, a citizen of the United States, residing at Huttig, in the county of Union and State of Arkansas, have invented certain new and useful Improvements in Rod-Packing, of which the following is a specification, reference being had therein to the accompanying drawing.

This invention relates to packing especially adapted for piston rods and the like, and the principal object of the same is to provide a packing composed of metal and rubber which will automatically expand to compensate for wear.

Another object is to provide a packing which may be readily placed in position without the necessity of dismantling the rod and its connections.

In carrying out the objects of the invention generally stated above, it will be understood, of course, that the essential features thereof are necessarily susceptible of changes in details and structural arrangements, one preferred and practical embodiment of which is shown in the accompanying drawings, wherein—

Figure 1 is a vertical longitudinal sectional view of a stuffing box and piston rod, showing the box equipped with the improved packing. Fig. 2 is a detail perspective view of one of the sectional rings of the packing. Fig. 3 is an enlarged fragmentary detail end view of one of the sections of the packing ring.

Referring to said drawings by numerals, 1 designates a stuffing box, 2 the adjustable gland therefor, and 3 the piston rod which passes through the stuffing box and gland.

The improved packing forming the subject-matter of this invention is composed of a plurality of rings, each ring being preferably formed of three sectional segments having a central tubular core 4 of rubber or other resilient material. The core 4 is surrounded by the four metallic sections 5, each section having a concaved seat 6 on its inner face which fits over said core 4, the other surfaces of said sections being flat so that they present smooth flat surfaces to the piston rod 2, the box 1, the gland 3 and also to the sections of adjacent rings. As is shown in Figs. 1 and 2, the outer metallic sections have an opening 7 between their meeting faces and the inner sections have a similar opening 8 between their meeting faces, the openings 7 being in direct communication with the piston rod 3, and the openings 8 being in direct communication with the inner longitudinal surface of the stuffing box 1.

The gland 2 is held in adjustable relation to the stuffing box 1 by means of the usual bolts 9 and nuts 10.

It will be obvious that the greatest wear is upon the faces of the metallic sections which bear upon the piston rod 3, and it will, therefore, be seen that such wear may be compensated for by adjusting the gland 2, which expands the core 4 to the elliptical shape shown in Fig. 3 and spreads the sections 5 so that they will yieldably bear against the piston rod and the stuffing box. The improved packing may be readily placed around the piston and within the stuffing box by disengaging the gland from the box and sliding the gland along the piston rod a sufficient distance to permit free access to said box, the positioning of the packing within the box being facilitated owing to the fact that each ring is formed in sections.

What I claim as my invention is:—

1. A rod packing comprising a segmental metallic ring, each segment being in sections the inner face of which is provided with a concaved seat, and a resilient core for each segment which is surrounded by said sections.

2. A rod packing comprising a segmental metallic ring, each segment being composed of complemental sections, and a tubular resilient core for each segment which is surrounded by the sections thereof.

3. A rod packing comprising a segmental ring, each segment being composed of complemental sections having flat outer surfaces and a concaved inner surface, and a tubular resilient core for each segment which is surrounded by said sections.

4. A rod packing comprising a plurality of metallic sections having a concaved inner face, said sections being curved on an arc of a circle and forming, when assembled, a segmental hollow ring, and a resilient core for each segment of said ring.

In testimony whereof I hereunto affix my signature in presence of two witnesses.

ELMER E. SWITZER.

Witnesses:
  M. B. SCOTT,
  C. HOWARD.